Patented Oct. 8, 1935

2,016,836

UNITED STATES PATENT OFFICE 2,016,836

HETEROCYCLIC NITROGEN COMPOUNDS

Henry Alfred Piggott, Cheadle Hulme, England, assignor to Imperial Chemical Industries Limited, a corporation of Great Britain No Drawing. Application February 6, 1932, Serial No. 591,457. In Great Britain February 11, 1931

18 Claims. (Cl. 260—47)

This invention relates to chemical compounds, more particularly heterocyclic nitrogen compounds of the indole series, and a process for the production thereof.

It is an object of the invention to produce new heterocyclic nitrogen compounds which are valuable intermediates in the dye and pharmaceutical industries. A further object is the provision of a new and improved process for producing compounds of the character above described. Other objects of the invention will be apparent by reference to the following description thereof.

These objects are accomplished according to the invention by producing compounds having the probable formula:

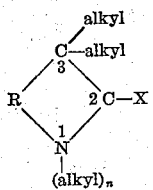

wherein R represents a phenyl nucleus containing as a substituent at least one nitro or amino group, X represents an alkyl or alkylidene radical, and $n$ is 1 when X is an alkylidene radical and 0 when X is an alkyl radical. It will be understood, of course, that when X represents an alkylidene radical there is a double bond between X and the carbon atom in the 2-position. On the other hand, when X is an alkyl radical the double bond occurs between the nitrogen atom in the 1-position and the carbon atom in the 2-posiiton. These compounds are obtained by treating a 2-alkyl-3:3-dialkylindolenine or a 1:3:3-trialkyl-2-alkylidene-indoline with a suitable nitrating agent, for example nitrating mixtures of nitric and sulfuric acids or of alkali metal nitrates and sulfuric acid. The nitro-group or groups attached to the phenyl nucleus of the resultant compound may be reduced subsequently to aminogroups and the products thereby obtained may be treated in any of the well known ways to produce other chemical compounds.

While the invention is susceptible of considerable variation and modification in the manner of its practical application particularly as regards the proportions of materials, temperatures, and exact procedure employed, the following examples will illustrate the class of products falling within the invention and how they may be prepared. The proportions are given in parts by weight.

Example I

Nitration.—About 20 parts of 1:3:3-trimethyl-2-methylene-indoline having the following probable formula:

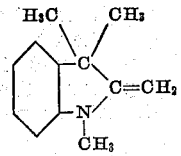

is mixed with 92 parts of concentrated sulfuric acid, while maintaining the temperature below about 60° C. The solution is cooled to 20° C. and 7.5 parts of nitric acid (sp. gr. 1.5) is slowly added, care being taken that the temperature does not exceed 25° C. The mixture is then allowed to stand for 1 hour at 20–25° and is thereafter poured into 250 parts of cold water, or ice and water, and caustic soda is added until substantially all of the acid is neutralized and the base is completely precipitated. The precipitate is filtered off, washed and dried. By any suitable method, such as fractional crystallization, the product may be separated into two components having melting points of 100° C. and 140–143° C., respectively, and which appear to be two mononitro-1:3:3-trimethyl-2-methylene-indolines.

Reduction.—Thirteen and three-tenth parts of the nitro base (M. P. 100°) from example I is charged slowly into a suspension of 12 parts of iron powder in 120 parts of 3% acetic acid at 65–70°, and the mixture subsequently heated to boiling, cooled and filtered. The amino-compound is precipitated from the filtrate by addition of caustic soda solution, filtered and dried at 40–50°, and when pure has a melting point of about 100° C.

Example II

2:3:3-trimethylindolenine having the following general formula:

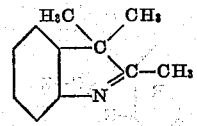

is nitrated in a manner similar to that described in Example I, for 13.9 parts of the base, 72 parts of sulfuric acid and 6.8 parts of nitric acid (sp. gr. 1.51) being employed. The product, isolated as before, and crystallized from methyl alcohol, has a melting point of about 129° C. A small quantity of an isomeride appears to be present in this case also. The base of M. P. 129° gives, when heated with methyl iodide, the iodide of the nitro-1:3:3 - trimethyl - 2 - methylene - indoline of M. P. 100°, described in the previous example.

*Example III*

To a solution of 10 parts of 1:3-dimethyl-3-ethyl-2-methylene-indoline in 38 parts of concentrated sulfuric acid is added a mixture of 4 parts of nitric acid, sp. gr. 1.5, and 18% concentrated sulfuric acid at such a rate that the temperature does not rise above 20°. After standing for 1 hour at 20–25° C. the mixture is then poured into water and, after cooling, basified with ammonia or sodium hydroxide. The precipitated base, after purification has a melting point of about 79–80° C.

In Examples II and III, it will be understood that the products obtained may be reduced to amino compounds in a manner similar to that described in Example I, or other chemical compounds may be formed therefrom by the usual methods well known in the art.

While the invention is not limited to the use of any particular temperatures, the temperature employed should be less than that giving rise to decomposition of the compounds involved in the reaction. Generally speaking, the temperatures maintained during the nitration should be less than about 25° C.

The compounds produced in accordance with the invention are especially valuable as intermediates in the production of dyes and pharmaceutical products. That it should be possible to produce compounds of this character by nitration could not be foreseen; rather was it to be expected that instead of identifiable chemical compounds there would be obtained an intractable mixture of decomposition products since it is well known that alkylated indolines and indolenines undergo oxidation and condensation quite readily.

Throughout the specification and claims it will be understood that by alkyl is meant the radical formed from an acyclic hydrocarbon by the removal of one atom of hydrogen, such as, for example, —CH₃, —C₂H₅, etc. By the term alkylidene is meant the radical

in which R₁ represents —H or an alkyl group.

As many apparent and widely different embodiments of this invention may be made without departing from the spirit thereof, it is to be understood that I do not limit myself to the foregoing examples or description except as indicated in the following claims.

I claim:

1. Chemical compounds having the following formula

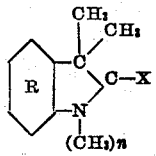

wherein R represents a phenyl nucleus containing as a substituent at least one nitro or amino group, X represents an alkyl or alkylidene radical and $n$ is 1 when X is an alkylidene radical and 0 when X is an alkyl radical.

2. A chemical compound which is a nitro-1:3:3-trimethyl-2-methylene-indoline having a melting point of about 100° C.

3. A chemical compound which is a nitro-1:3:3-trimethyl-2-methylene-indoline having a melting point of about 140° C.

4. A nitro-1,3-dimethyl-3-ethyl-2-methylene indoline having a melting point of about 79° C. to about 80° C.

5. Chemical compounds having the following general formula

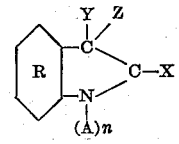

wherein R represents a phenyl nucleus containing as a substituent at least one nitro or amino group, X represents a lower alkyl or a lower alkylidene radical, A, Y and Z represent lower alkyl radicals, and $n$ is 1 when X is a lower alkylidene radical and O when X is a lower alkyl radical.

6. Chemical compounds having the following general formula

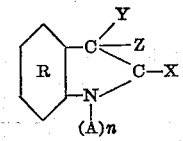

wherein R represents a phenyl nucleus containing as a substituent at least one nitro or amino group, X represents a lower alkyl of a lower alkylidene radical, A, Y and Z represent lower alkyl radicals, at least one of which contains more than one carbon atom, and $n$ is 1 when X is a lower alkylidene radical and O when X is a lower alkyl radical.

7. Chemical compounds having the following general formula

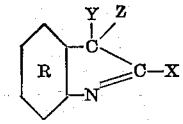

wherein R represents a phenyl nucleus containing as a substituent at least one nitro or amino group, and X, Y and Z represent lower alkyl radicals.

8. Chemical compounds having the following general formula

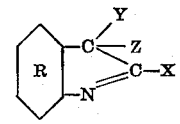

wherein R represents a phenyl nucleus containing as a substituent at least one nitro group, and X, Y and Z represent lower alkyl radicals.

9. Chemical compounds having the following general formula

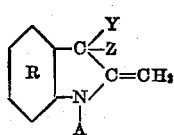

wherein R represents a phenyl nucleus containing as a substituent at least one nitro group, and A, Y and Z represent lower alkyl radicals, at least one of which contains more than one carbon atom.

10. Chemical compounds having the following general formula

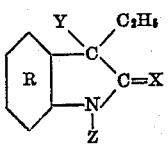

wherein R represents a phenyl nucleus containing as a substituent at least one nitro or amino group, X represents a lower alkylidene radical, and Y and Z represent lower alkyl radicals.

11. Chemical compounds having the following general formula

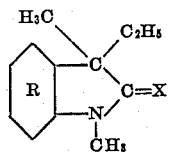

wherein R represents a phenyl nucleus containing as a substituent at least one nitro or amino group, and X represents a lower alkylidene radical.

12. In a process for the production of heterocyclic nitrogen compounds, the step which comprises treating a compound having the following general formula

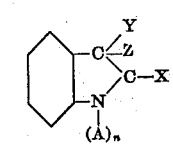

whereein X represents a lower alkyl or lower alkylidene radical, A, Y and Z represent lower alkyl radicals, and $n$ is 1 when X is a lower alkylidene radical and O when X is a lower alkyl radical, with a nitrating agent.

13. In a process for the production of heterocyclic nitrogen compounds, the step which comprises treating a compound having the following general formula

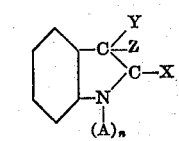

wherein X represents a lower alkyl or lower alkylidene radical, A, Y and Z represent lower alkyl radicals, and $n$ is 1 when X is a lower alkylidene radical and O when X is a lower alkyl radical, with a mixture of concentrated sulfuric and nitric acids.

14. In a process for the production of heterocyclic nitrogen compounds, the step which comprises mixing a compound having the following general formula

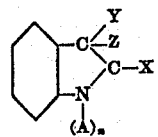

wherein X represents a lower alkyl or lower alkylidene radical, A, Y and Z represent lower alkyl radicals, and $n$ is 1 when X is a lower alkylidene radical and O when X is a lower alkyl radical, with concentrated sulfuric acid at a temperature below about 60° C., and treating the mixture with nitric acid at a temperature below about 25° C.

15. In a process for the production of heterocyclic nitrogen compounds, the steps which comprise mixing a compound having the following general formula

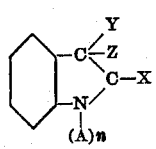

wherein X represents a lower alkyl or lower alkylidene radical, A, Y and Z represent lower alkyl radicals, and $n$ is 1 when X is a lower alkylidene radical and O when X is a lower alkyl radical, with concentrated sulfuric acid at a temperature below about 60° C., treating the mixture with nitric acid at a temperature below about 25° C., neutralizing, and subjecting the resultant product to fractional crystallization.

16. The process of claim 14 in which the compound treated has the following general formula

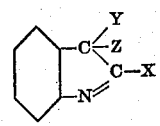

wherein X, Y and Z represent lower alkyl radicals.

17. The process of claim 14 in which the compound treated has the following general formula

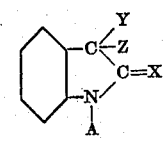

in which X represents a lower alkylidene radical, and A, Y and Z represent lower alkyl radicals.

18. The process of claim 15 in which the compound treated is 1:3:3-trimethyl-2-methyleneindoline.

HENRY ALFRED PIGGOTT.